(12) United States Patent
Chen et al.

(10) Patent No.: US 8,248,139 B2
(45) Date of Patent: Aug. 21, 2012

(54) SIMPLE INTERLEAVED PHASE SHIFT CLOCK SYNCHRONIZATION FOR MASTER/SLAVE SCHEME

(75) Inventors: Isaac Y. Chen, Hsinchu County (TW); An-Tung Chen, Taoyuan County (TW)

(73) Assignee: Richtek Technology Corp., Hsinchu (TW)

( * ) Notice: Subject to any disclaimer, the term of this patent is extended or adjusted under 35 U.S.C. 154(b) by 127 days.

(21) Appl. No.: 12/977,662

(22) Filed: Dec. 23, 2010

(65) Prior Publication Data
US 2011/0163785 A1   Jul. 7, 2011

(30) Foreign Application Priority Data
Jan. 7, 2010   (TW) .............................. 99100260 A (51) Int. Cl.
*G06F 1/04*   (2006.01)

(52) U.S. Cl. ............................ 327/298; 327/99; 327/291
(58) Field of Classification Search .................. None
See application file for complete search history.

(56) References Cited

U.S. PATENT DOCUMENTS
8,058,939 B2 * 11/2011 Bea et al. ...................... 331/150
* cited by examiner

*Primary Examiner* — An Luu
(74) *Attorney, Agent, or Firm* — Rosenberg, Klein & Lee (57) ABSTRACT

An apparatus for interleaved phase shift clock synchronization includes a master clock generator and at least one slave clock generator. The master clock generator provides a ramp signal or reset signal for each slave clock generator to generate a clock synchronized with the clock of the master clock generator, and the master and slave clock generators have different reference voltages for generating clocks. Therefore, the clocks generated will be synchronized and interleaved phase with each other.

20 Claims, 13 Drawing Sheets

SIMPLE INTERLEAVED PHASE SHIFT CLOCK SYNCHRONIZATION FOR MASTER/SLAVE SCHEME

FIELD OF THE INVENTION

The present invention is related generally to a multiple pulse width modulation (PWM) regulator system and, more particularly, to interleaved phase shift clock synchronization for a multiple PWM regulator system.

BACKGROUND OF THE INVENTION

Figure 1:
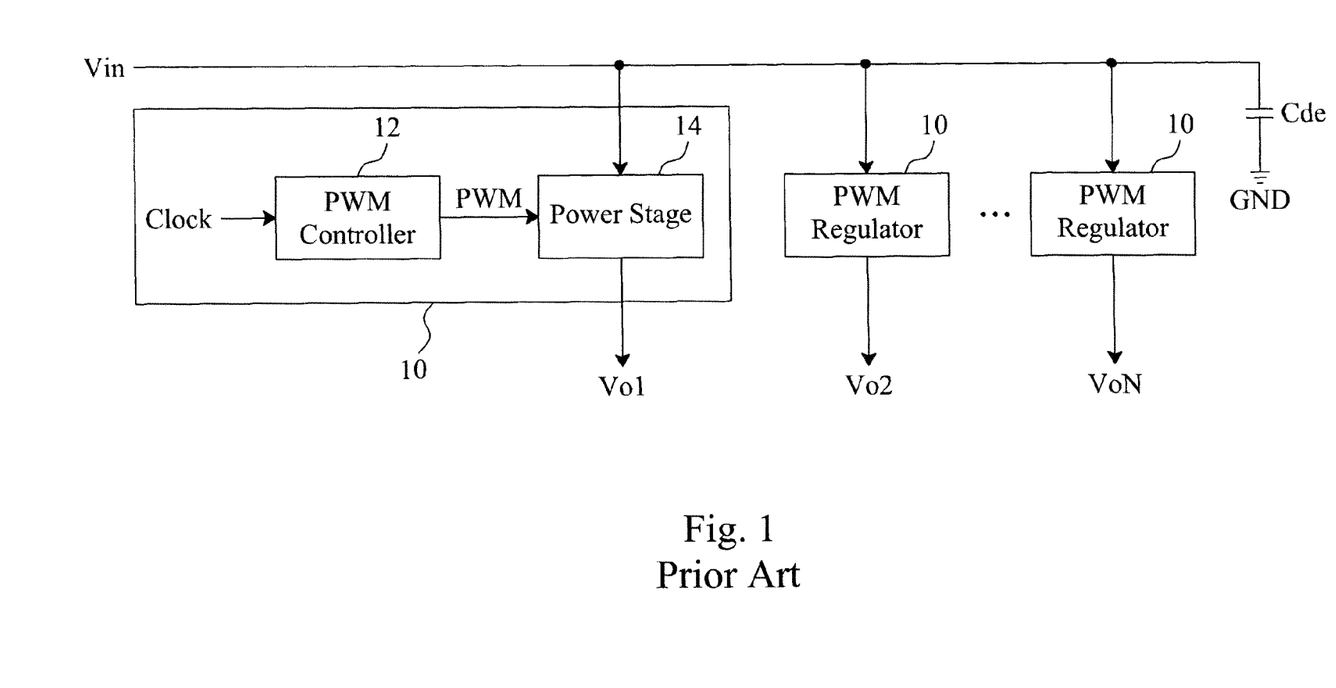
FIG. 1 is a block diagram of a conventional multiple PWM regulator system.

As shown in FIG. 1, a multiple PWM regulator system includes multiple PWM regulators 10 to convert an input voltage Vin to multiple output voltages Vo1-VoN, respectively, and a decoupling capacitor Cde coupled to the voltage input terminal Vin to reduce the ripples of the input voltage Vin. Each of the PWM regulators 10 has a PWM controller 12 responsive to a respective clock to trigger a pulse width modulation signal PWM to drive a power stage 14 to convert the input voltage Vin to the output voltage. Due to each of the PWM regulators 10 having a respective clock, noise perceptible to the human ear will be produced if the multiple clocks have any frequency difference between 20 Hz and 20 KHz.

Figure 2:
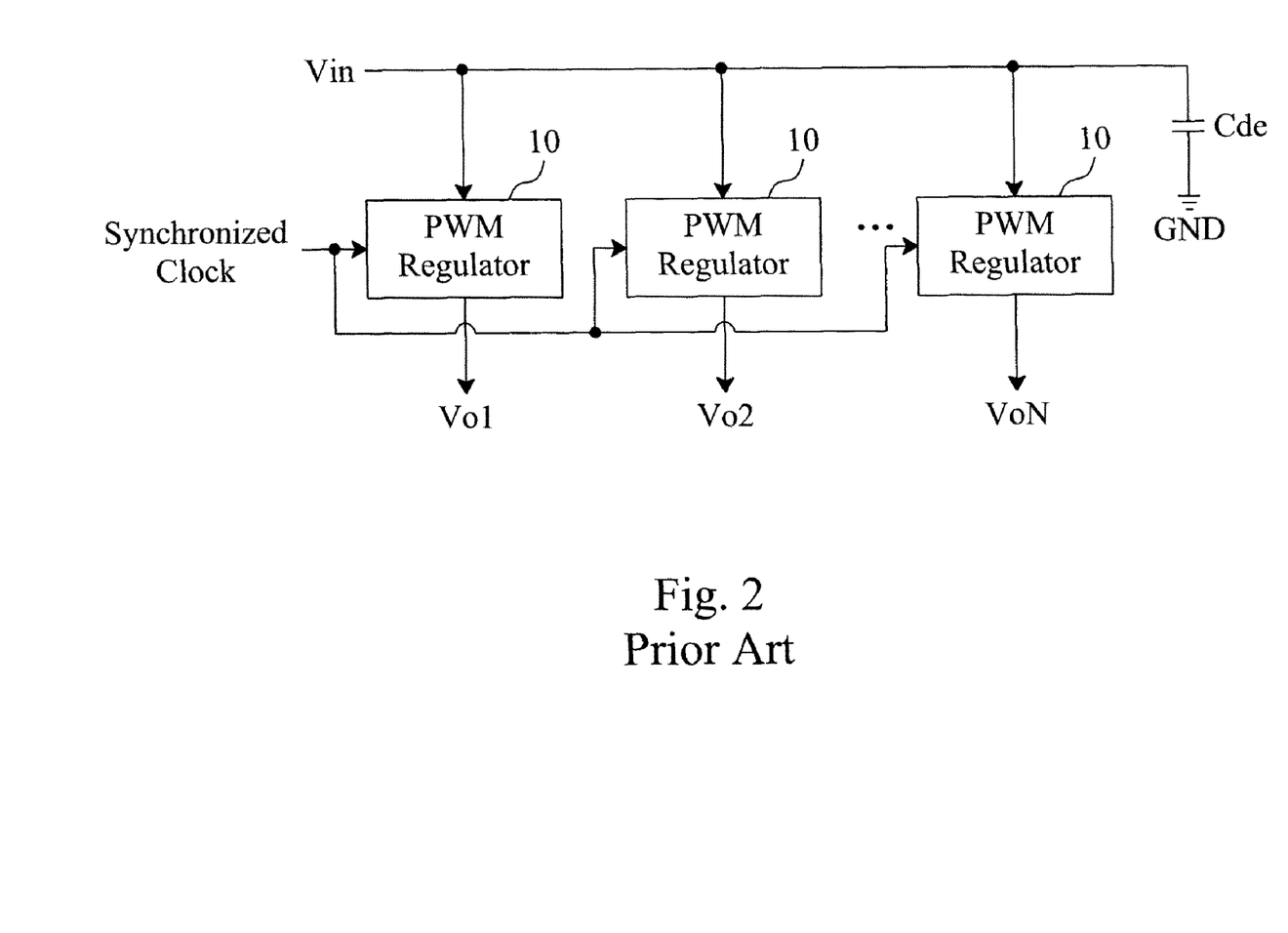
FIG. 2 is a block diagram of a conventional clock synchronization multiple PWM regulator system.
Figure 3:
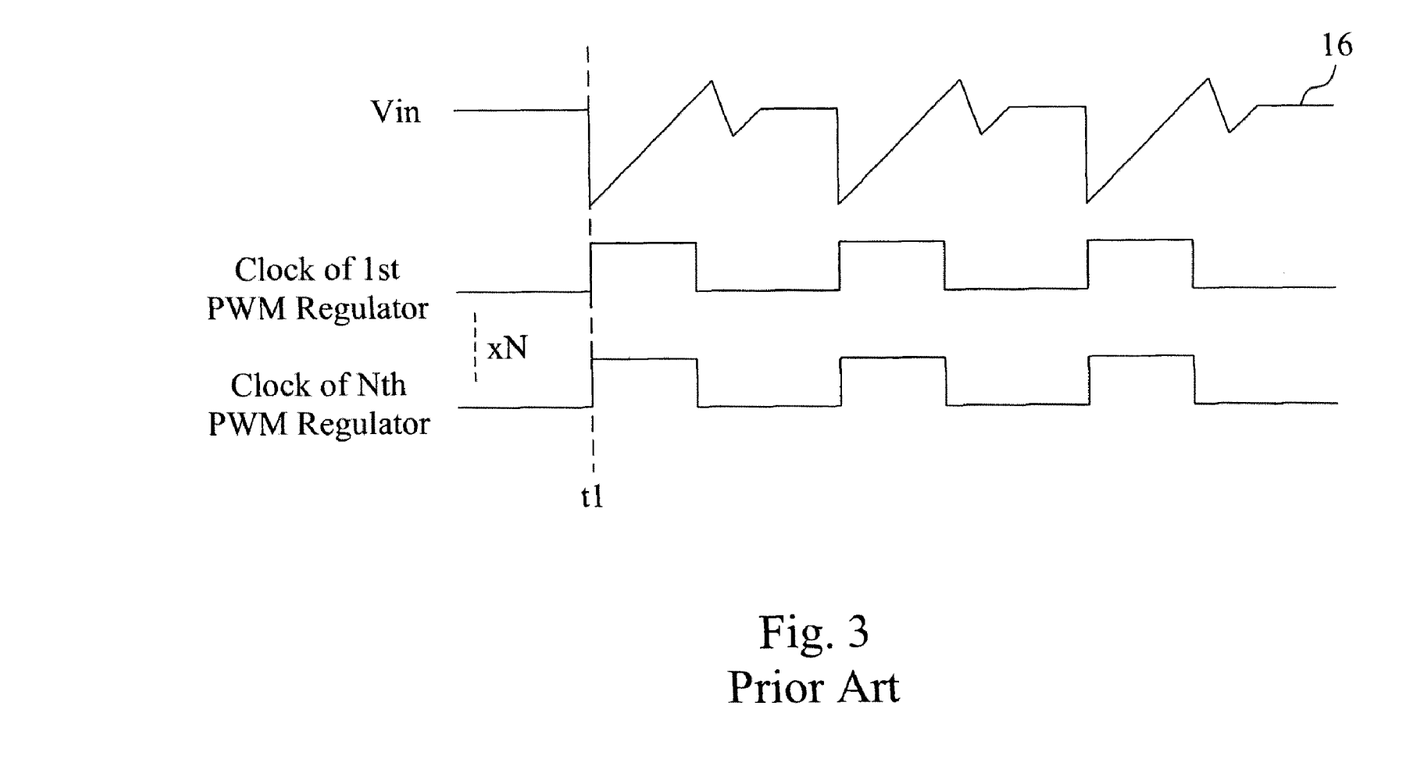
FIG. 3 is a waveform diagram of the circuit shown in FIG. 2.

In a multiple PWM regulator system, clock synchronization is an approach to well control the noise caused by the frequency difference between the multiple clocks. As shown in FIG. 2, a clock synchronized multiple PWM regulator system uses a same clock for all the PWM regulators 10 to trigger the pulse width modulation signals PWM and as a result, as shown by the waveform 16 at time t1 in FIG. 3, large ripple is produced in the input voltage Vin since all the pulse width modulation signals PWM are simultaneously switched on/off, which will cause electro-magnetic interference (EMI) issue and may damage the PWM regulators 10.

Figure 4:
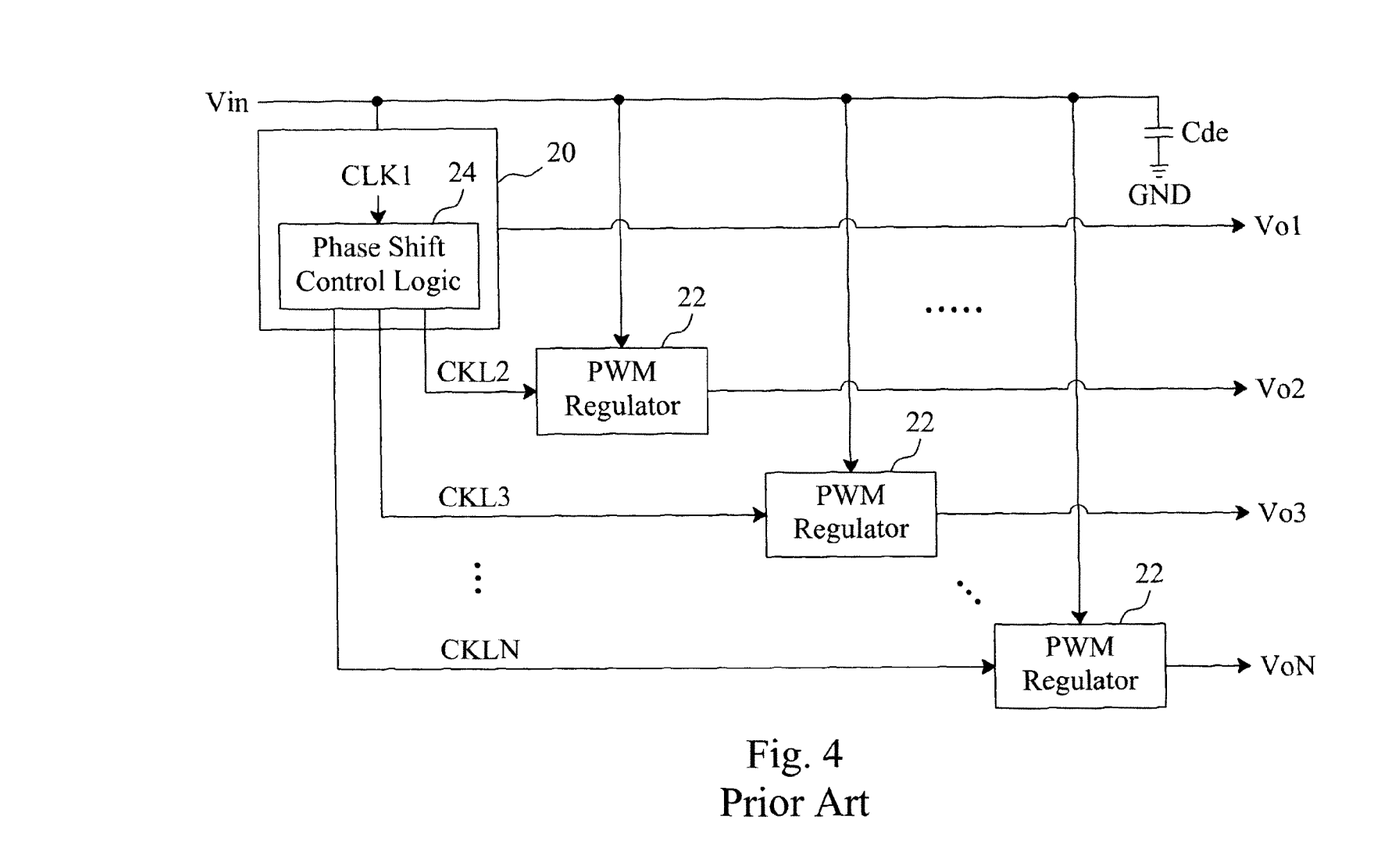
FIG. 4 is a block diagram of a conventional interleaved clock synchronization multiple PWM regulator system.
Figure 5:
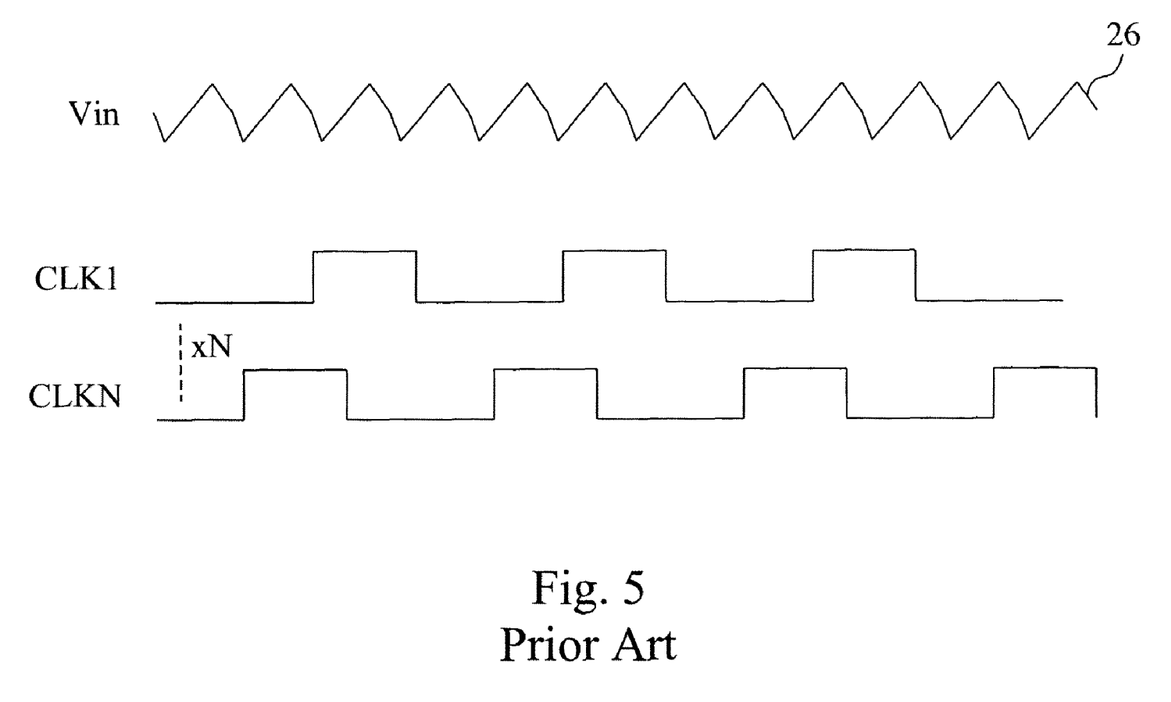
FIG. 5 is a waveform diagram of the circuit shown in FIG. 4.

It is feasible to reduce the ripple of the input voltage Vin by increasing the decoupling capacitance Cde; however, costs are increased consequently. In order to reduce the Vin decoupling capacitance Cde, there are some approaches, such as phase locked loop (PLL), to achieve interleaved phase between the multiple PWM regulators with interleaved clock synchronization. As shown by the stackable master/slave scheme of FIG. 4, a master PWM regulator 20 provides clocks CLK2-CLKN for slave PWM regulators 22. The slave PWM regulator 22 has the same circuit as that of the PWM regulator 10 shown in FIG. 1, while the master PWM regulator 20 further includes a phase shift control logic 24 to shift the clock CLK1 of the master PWM regulator 20 to generate the clocks CLK2-CLKN for the slave PWM regulators 22. As shown by the waveform 26 of FIG. 5, clock interleaved can reduce the Vin ripple without increasing the Vin decoupling capacitance Cde.

There have been proposed many methods for interleaved phase shift clock synchronization. For example, U.S. Pat. No. 7,493,504 uses PLL and external setting to extract different phase. However, PLL costs large cost penalty for integrated circuit (IC) and makes the circuit more complicated. U.S. Pat. No. 7,259,687 discloses a system and method for distributing phase information, in which a master PWM regulator provides a source current for a resistor network to generate a plurality of voltages applied to a plurality of slave PWM regulators, respectively, and each of the slave PWM regulators compares the received voltage with a plurality of preset values to determine its relative position and actuation timing. For example, a received voltage between first and second preset values indicates that the PWM regulator receiving this voltage is the first slave PWM regulator and likewise, a received voltage between second and third preset values indicates that the PWM regulator receiving this voltage is the second slave PWM regulator. The other slave PWM regulators are also identified in the same way. However, the quantity of the preset values determines the maximum number of PWM regulators allowed in a multiple PWM system, which makes the application lack of flexibility.

Therefore, it is desired a simple method for interleaved phase shift clock synchronization that allows an arbitrary number of PWM regulators to establish a multiple PWM system.

SUMMARY OF THE INVENTION

An object of the present invention is to provide a clock generator for generating clocks with phase difference therebetween.

Another object of the present invention is to provide an apparatus and method for interleaved phase shift clock synchronization for a multiple PWM regulator system.

A further object of the present invention is to provide an apparatus and method for generating a plurality of synchronized and phase interleaved clocks.

Yet a further object of the present invention is to provide a simple apparatus and method for interleaved phase shift clock synchronization.

According to the present invention, a clock generator includes a reference voltage generator enabled by a master signal to generate a reference voltage applied to a first input/output terminal, a ramp generator enabled by the master signal to provide a ramp signal applied to a second input/output terminal and to generate a first clock depending on the ramp signal and the reference voltage, a comparator to compare signals at the first and second input/output terminals to generate a comparison signal, a pulse generator responsive to the comparison signal to generate a second clock, and a multiplexer responsive to the master signal to select one of the first and second clocks as an output signal.

According to the present invention, an apparatus for interleaved phase shift clock synchronization includes a master clock generator and at least one slave clock generator. The master clock generator has a ramp generator to provide a ramp signal and generates a first clock depending on the ramp signal and a first reference voltage. The slave clock generator has a comparator to compare the ramp signal with a second reference voltage to generate a comparison signal, and a pulse generator responsive to the comparison signal to generate a second clock synchronized and phase interleaved with the first clock.

According to the present invention, a method for interleaved phase shift clock synchronization provides a ramp signal, compares the ramp signal with a first reference voltage to generate a first comparison signal, generates a first clock responsive to the first comparison signal, compares the ramp signal with a second reference voltage to generate a second comparison signal, and responsive to the second comparison signal, generates a second clock synchronized and phase interleaved with the first clock.

According to the present invention, a clock generator includes a ramp generator to provide a ramp signal, to generate a first clock depending on the ramp signal and a first reference voltage, and to trigger a first reset signal applied to an input/output terminal responsive to a master signal or to reset the ramp signal responsive to a second reset signal received from the input/output terminal, a reference voltage generator to generate a second reference voltage responsive to an input signal received from an input terminal, a comparator to compare the ramp signal with the second reference voltage to generate a comparison signal, a pulse generator responsive to the comparison signal to generate a second clock, and a multiplexer responsive to the master signal to select one of the first and second clocks as an output signal.

According to the present invention, an apparatus for interleaved phase shift clock synchronization includes a master clock generator and at least one slave clock generator. The master clock generator has a first ramp generator to provide a first ramp signal and a reset signal synchronized with the first ramp signal, and generates a first clock depending on the first ramp signal and a first reference voltage. The slave clock generator has a second ramp generator to provide a second ramp signal and to reset the second ramp signal responsive to the reset signal, a comparator to compare the second ramp signal with a second reference voltage to generate a comparison signal, and a pulse generator responsive to the comparison signal to generate a second clock synchronized and phase interleaved with the first clock.

According to the present invention, a method for interleaved phase shift clock synchronization provides a first ramp signal, a second ramp signal, and a reset signal for resetting the second ramp signal, generates a first clock depending on the first ramp signal and a first reference voltage, and generate a second clock synchronized and phase interleaved with the first clock depending on the second ramp signal and a second reference voltage. The reset signal is synchronized with the first ramp signal such that the second ramp signal will be synchronized with the first ramp signal According to the present invention, an apparatus uses a master/slave scheme to implement interleaved phase shift clock synchronization, by which a master clock generator provides a reference voltage for each slave clock generator to get an arbitrary voltage reference for generating a phase shift, and a ramp signal or reset signal for each slave clock generator to generate a clock synchronized with the clock of the master clock generator, and therefore, doesn't need any PLL and thus is advantageously characterized by simple circuit and low costs.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 6:
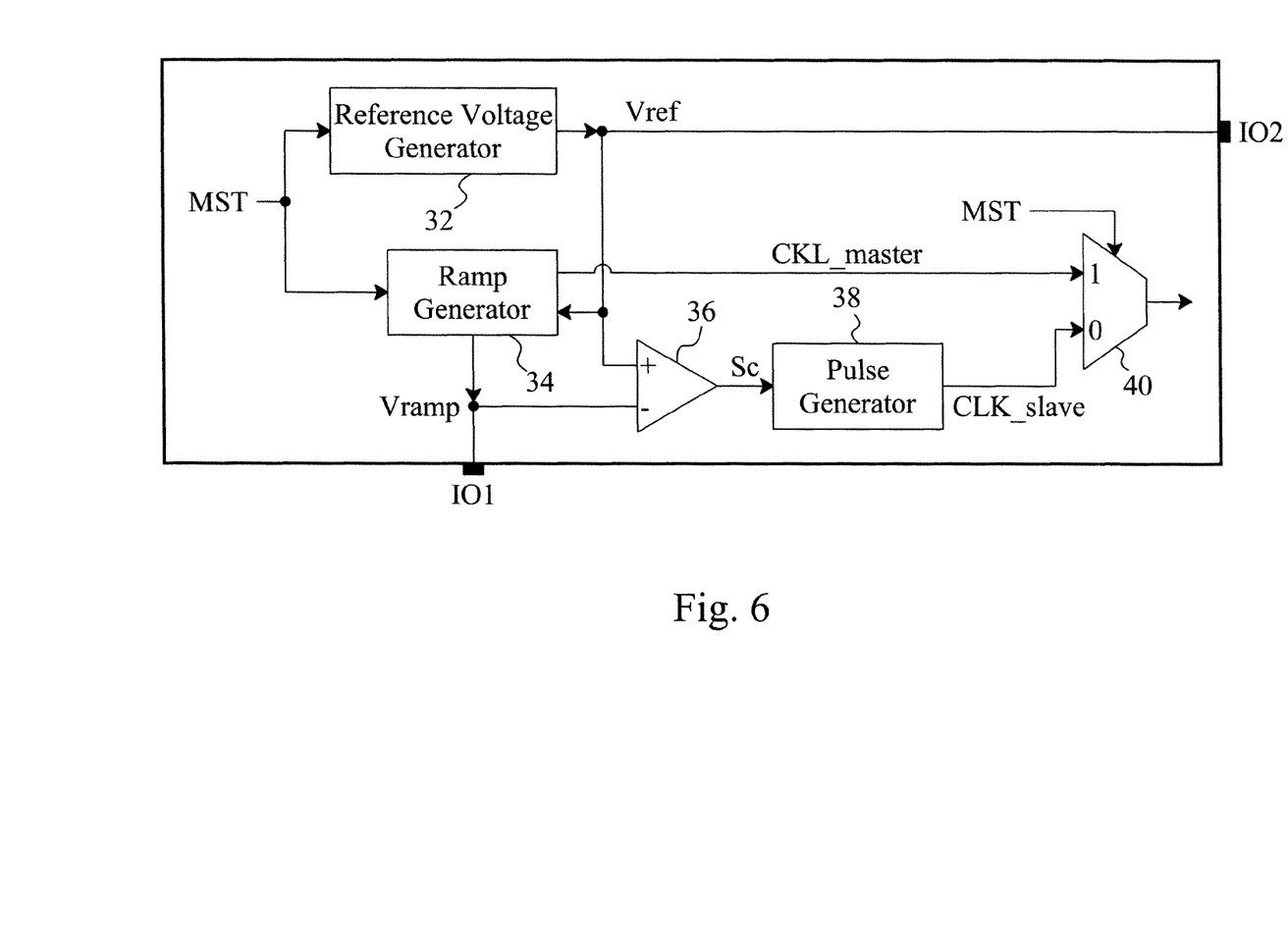
FIG. 6 is a circuit diagram of a clock generator according to the present invention.

FIG. 6 is a circuit diagram of a clock generator according to the present invention, in which a reference voltage generator 32 provides a reference voltage Vref applied to an input/output terminal IO2 after it is enabled by a master signal MST, a ramp generator 34 provides a ramp signal Vramp applied to an input/output terminal IO1 and generates a clock CLK_master depending on the ramp signal Vramp and the reference voltage Vref after it is enabled by the master signal MST, a comparator 36 compares the signals at the input/output terminals IO1 and IO2 to generate a comparison signal Sc, a pulse generator 38 generates a clock CLK_slave responsive to the comparison signal Sc, and a multiplexer 40 selects one of the clocks CLK_master and CLK_slave as an output signal responsive to the master signal MST. In this embodiment, when the master signal MST is logic "1", the reference voltage generator 32 and the ramp generator 34 are enabled, and the multiplexer 40 selects the clock CLK_master as the output signal; and when the master signal MST is logic "0", the reference voltage generator 32 and the ramp generator 34 are disabled, and the multiplexer 40 selects the clock CLK_slave as the output signal.

Figure 7:
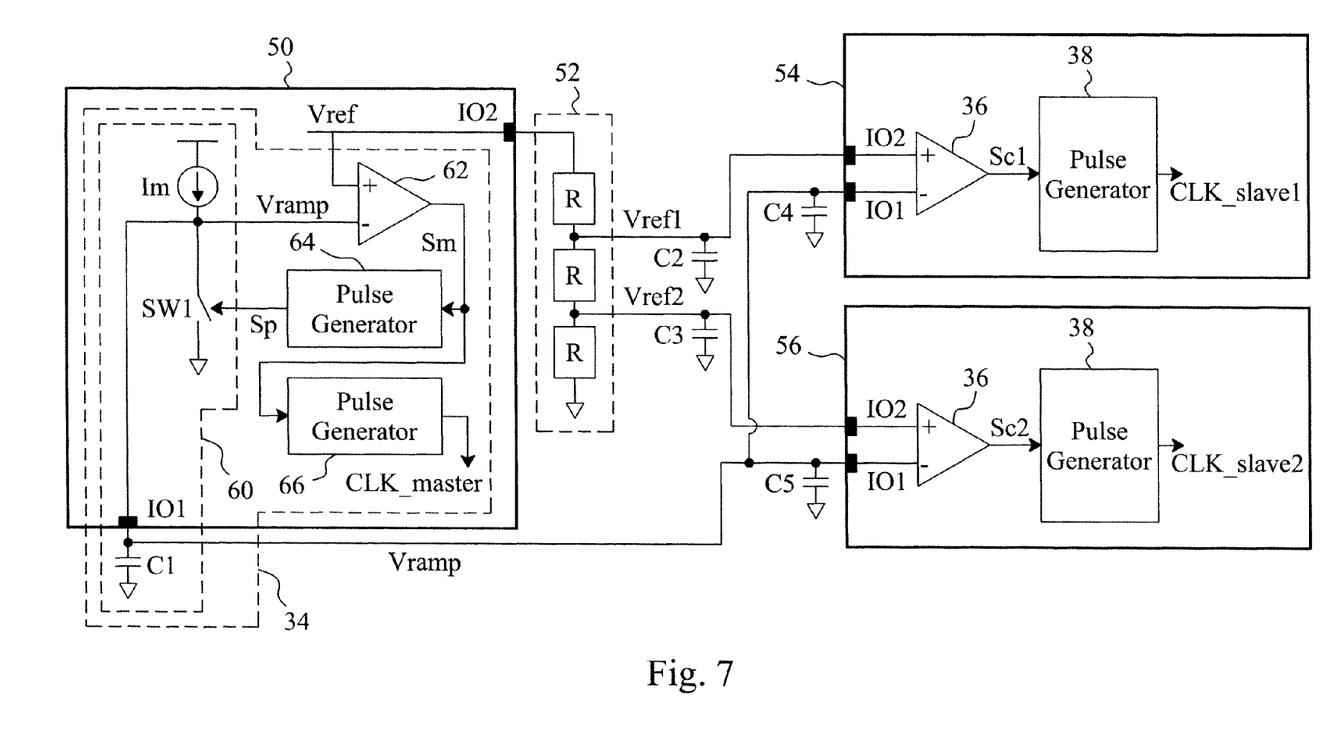
FIG. 7 is a first embodiment of an apparatus using the clock generator of FIG. 6 to establish a master/slave scheme for implementing interleaved phase shift clock synchronization.

FIG. 7 is a first embodiment of an apparatus using the clock generator of FIG. 6 to establish a master/slave scheme for implementing interleaved phase shift clock synchronization, in which a master clock generator 50 has an equivalent circuit of FIG. 6 with the master signal MST at logic "1", and each of slave clock generators 54 and 56 has an equivalent circuits of FIG. 6 with the master signal MST at logic "0". In the master clock generator 50, the ramp generator 34 has a charge/discharge circuit 60 to provide the ramp signal Vramp for a comparator 62 and applied to the input/output terminal IO1 of the master clock generator 50 for the slave clock generators 54 and 56, the charge/discharge circuit 60 has a capacitor C1 coupled to the input/output terminal IO1 of the master clock generator 50, a current source Im serially coupled to the capacitor C1, and a switch SW1 shunt to the capacitor C1, and is controlled by switching the switch SW1 to generate the ramp signal Vramp, the comparator 62 compares the ramp signal Vramp with the reference voltage Vref to generate a comparison signal Sm, a pulse generator 64 generates a control signal Sp responsive to the comparison signal Sm to switch the switch SW1, and a pulse generator 66 generates the clock CLK_master responsive to the comparison signal Sm. The reference voltage Vref provided by the master clock generator 50 is applied to a voltage divider 52 coupled to the input/output terminal IO2 of the master clock generator 50, to be divided by three serially coupled resistors R having a same resistance to generate reference voltages Vref1 and Vref2 applied to the input/output terminals 102 of the slave clock generators 54 and 56, respectively. Both the input/output terminals IO1 of the slave clock generator 54 and 56 are coupled to the input/output terminal IO1 of the master clock generator 50 to receive the ramp signal Vramp, and in each of the slave clock generators 54 and 56, a comparator 36 compares the ramp signal Vramp received from the input/output terminal IO1 of the slave clock generator 54 with its own reference voltage Vref1 or Vref2 to generate a comparison signal Sc1 or Sc2, an a pulse generator 38 generates a clock CLK_slave1 or CLK_slave2 responsive to the comparison signal Sc1 or Sc2. Capacitors C2, C3, C4 and C5 are coupled to the input/output terminals IO1, IO2 of the slave clock generators 54, 56 to reduce jitters of the ramp signal Vramp and the reference voltages Vref1, Vref2. The capacitors C2, C3, C4, and C5 can be the parasitic capacitors of electrically conductive wires.

Figure 8:
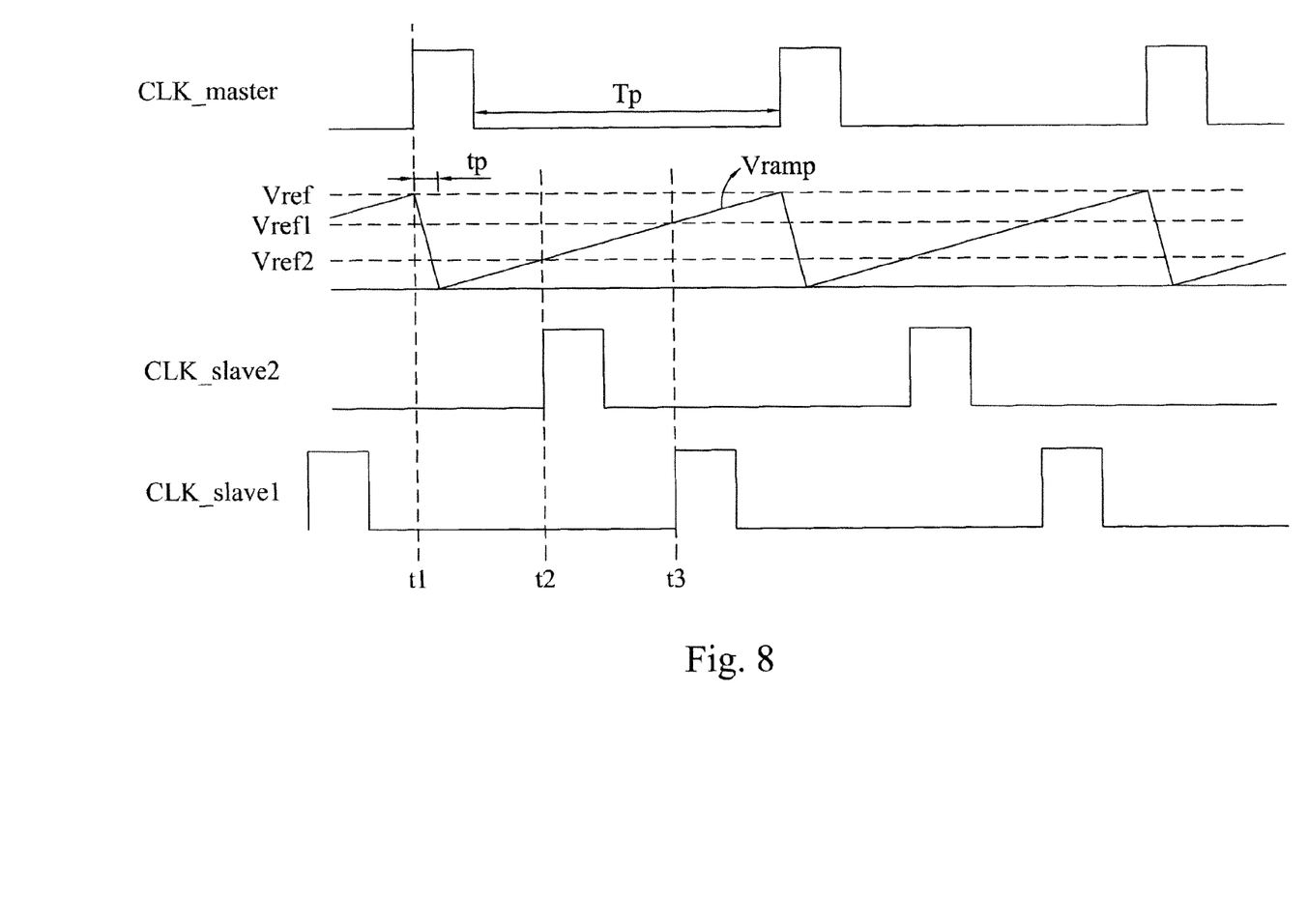
FIG. 8 is a waveform diagram of the circuit shown in FIG. 7.

FIG. 8 is a waveform diagram of the circuit shown in FIG. 7. Referring to FIGS. 7 and 8, in the master clock generator 50, when the ramp signal Vramp increases to the reference voltage Vref, as shown at time t1 for example, not only the pulse generator 66 triggers the clock CLK_master, but also the pulse generator 64 generates the control signal Sp having an on-time tp to reset the ramp signal Vramp; in the slave clock generator 54, when the ramp signal Vramp increases to the reference voltage Vref1, as shown at time t3 for example, the slave clock generator 54 triggers the clock CLK_slave1; and in the slave clock generator 56, when the ramp signal Vramp increases to the reference voltage Vref2, as shown at time t2 for example, the slave clock generator 56 triggers the clock CLK_slave2. In this embodiment, due to the master clock generator 50 and the slave clock generators 54 and 56 sharing the ramp signal Vramp, the clocks CLK_master, CLK_slave1 and CLK_slave2 are synchronized to each other. The reference voltage Vref1 is two-thirds as high as the reference voltage Vref, and the reference voltage Vref2 is one-third as high as the reference voltage Vref. Thus, there is a phase difference of 120° between each two of the clocks CLK_master, CLK_slave1 and CLK_slave2. To increase the number of the slave clock generators, it is feasible to increase the number of the serially coupled resistors in the voltage divider 52 to produce more reference voltages of different levels applied to the slave clock generators, respectively, to generate more phase interleaved clocks. For example, to add one more slave clock generator to the circuit of FIG. 7, it is feasible to add a serially coupled resistor R having the same resistance into the voltage divider 52 to produce one more reference voltage for the added slave clock generator; hence, there will be a phase difference of 90° (i.e., 360°/4) between each two of the four clocks CLK_master, CLK_slave1, CLK_slave2 and CLK_slave3. Since an apparatus for interleaved phase shift clock synchronization according to the present invention can be arbitrarily changed the number of the slave clock generators, a multiple PWM regulator system using this apparatus can be arbitrarily changed the number of the PWM regulators depending on demands. In another embodiment, the voltage divider 52 has serially coupled resistors having different resistances.

Figure 9:
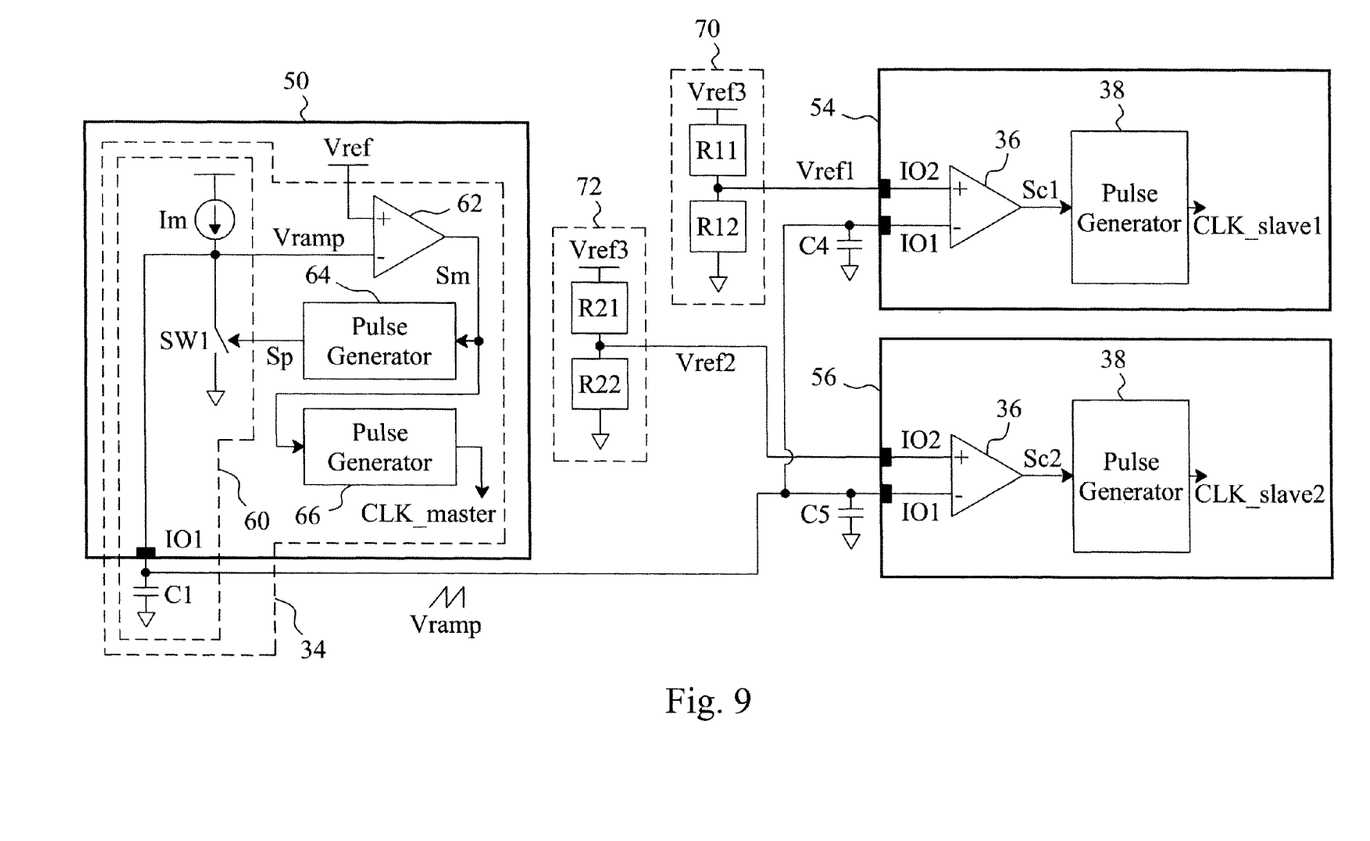
FIG. 9 is a second embodiment of an apparatus using the clock generator of FIG. 6 to establish a master/slave scheme for implementing interleaved phase shift clock synchronization.
Figure 10:
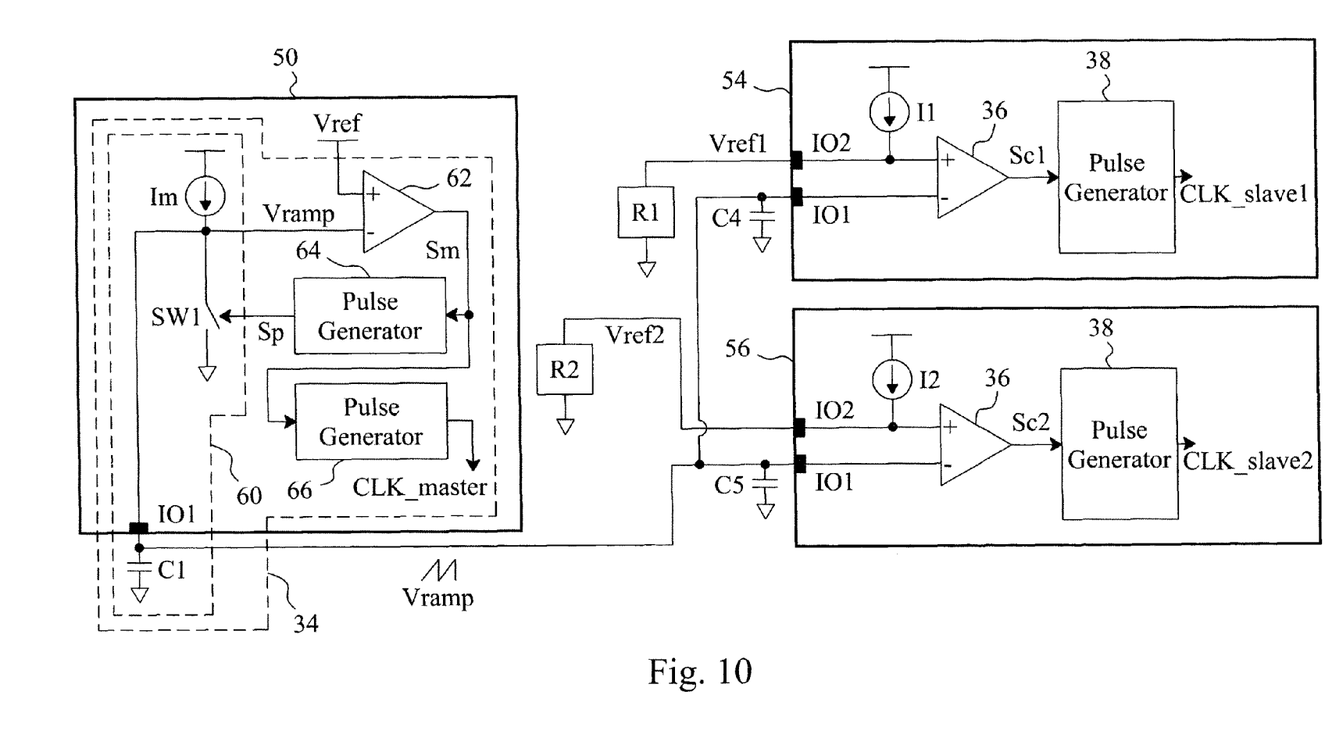
FIG. 10 is a third embodiment of an apparatus using the clock generator of FIG. 6 to establish a master/slave scheme for implementing interleaved phase shift clock synchronization.

There are some other approaches to generate the reference voltages Vref1 and Vref2 for the slave clock generators 54 and 56, and thus the ways of doing so are not limited to using the reference voltage Vref of the master clock generator 50. For example, as shown in FIG. 9, voltage dividers 70 and 72 provide the reference voltages Vref1 and Vref2 of different levels for the slave clock generators 54 and 56, respectively. The voltage divider 70 has serially coupled resistors R11 and R12 to divide a reference voltage Vref3 to generate the reference voltage Vref1, and the voltage divider 72 has serially coupled resistors R21 and R22 to divide the reference voltage Vref3 to generate the reference voltage Vref2. Alternatively, as shown in FIG. 10, the reference voltages Vref1 and Vref2 are generated by means of current sources I1 and I2 and resistors R1 and R2. The resistor R1 is coupled to the input/output terminal IO2 of the slave clock generator 54 such that the reference voltage Vref1 is generated because of the current provided by the current source I1, and the resistor R2 is coupled to the input/output terminal IO2 of the slave clock generator 56 such that the reference voltage Vref2 is generated because of the current provided by the current source I2.

Figure 11:
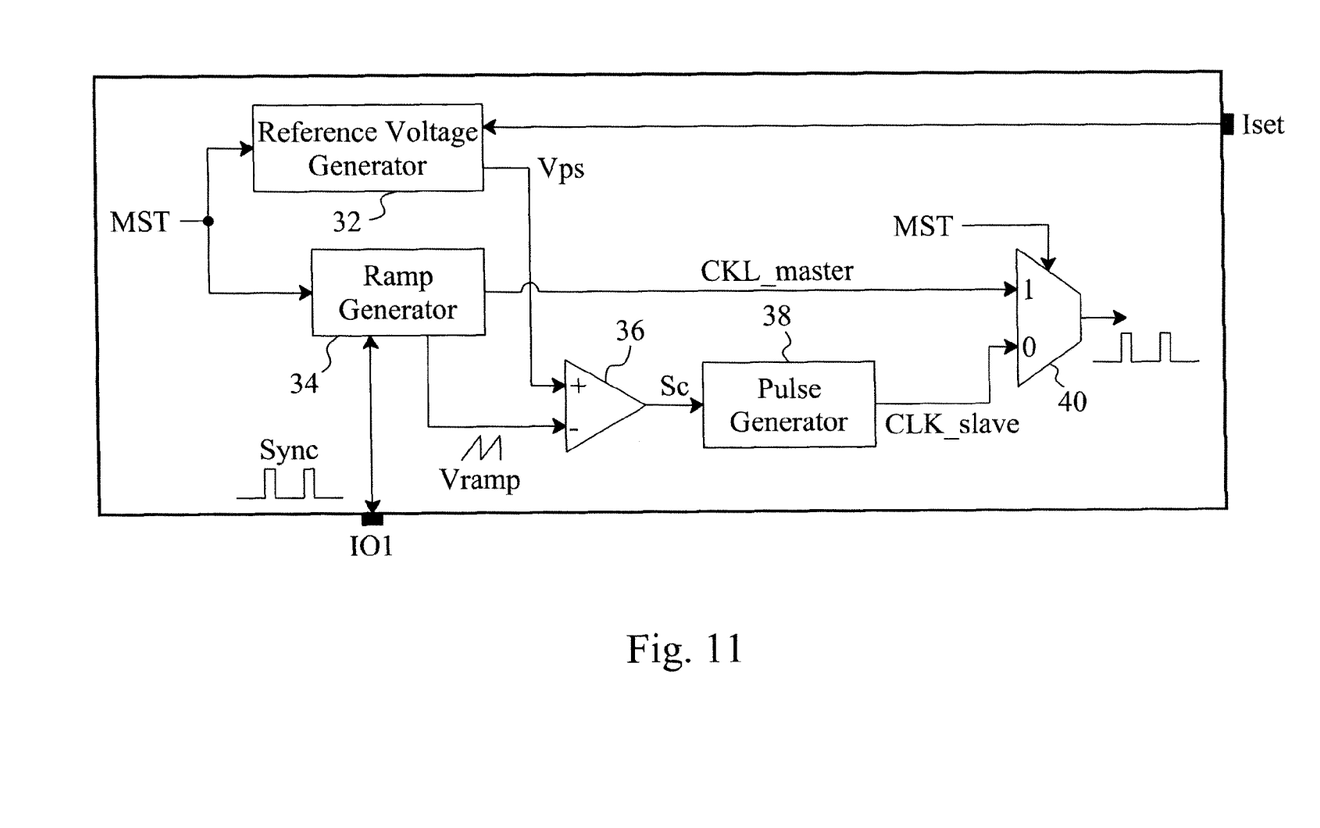
FIG. 11 is a circuit diagram of another clock generator according to the present invention.

FIG. 11 is a circuit diagram of another clock generator according to the present invention, in which after being enabled by a master signal MST, a reference voltage generator 32 provides a reference voltage Vps responsive to an input signal received from an input terminal Iset, and a ramp generator 34 provides a ramp signal Vramp and generates a clock CLK_master depending on the ramp signal Vramp and an internal reference voltage Vref of the ramp generator 34, a comparator 36 compares the ramp signal Vramp with the reference voltage Vps to generate a comparison signal Sc, a pulse generator 38 generates a clock CLK_slave responsive to the comparison signal Sc, and a multiplexer 40 responsive to the master signal MST selects the clock CLK_master or the clock CLK_slave as the output signal. In this embodiment, when the master signal MST is logic "1", in addition that the multiplexer 40 outputs the clock CLK_master, the ramp generator 34 further provides a reset signal Ssync applied to an input/output terminal IO1 responsive to the master signal MS; and when the master signal MST is logic "0", the reference voltage generator 32 is enabled, the ramp generator 34 receives the synchronous signal Ssync on the input/output 101 to reset the ramp signal Vramp and outputs the ramp signal Vramp to the comparator 36, and the multiplexer 40 outputs the clock CLK_slave.

Figure 12:
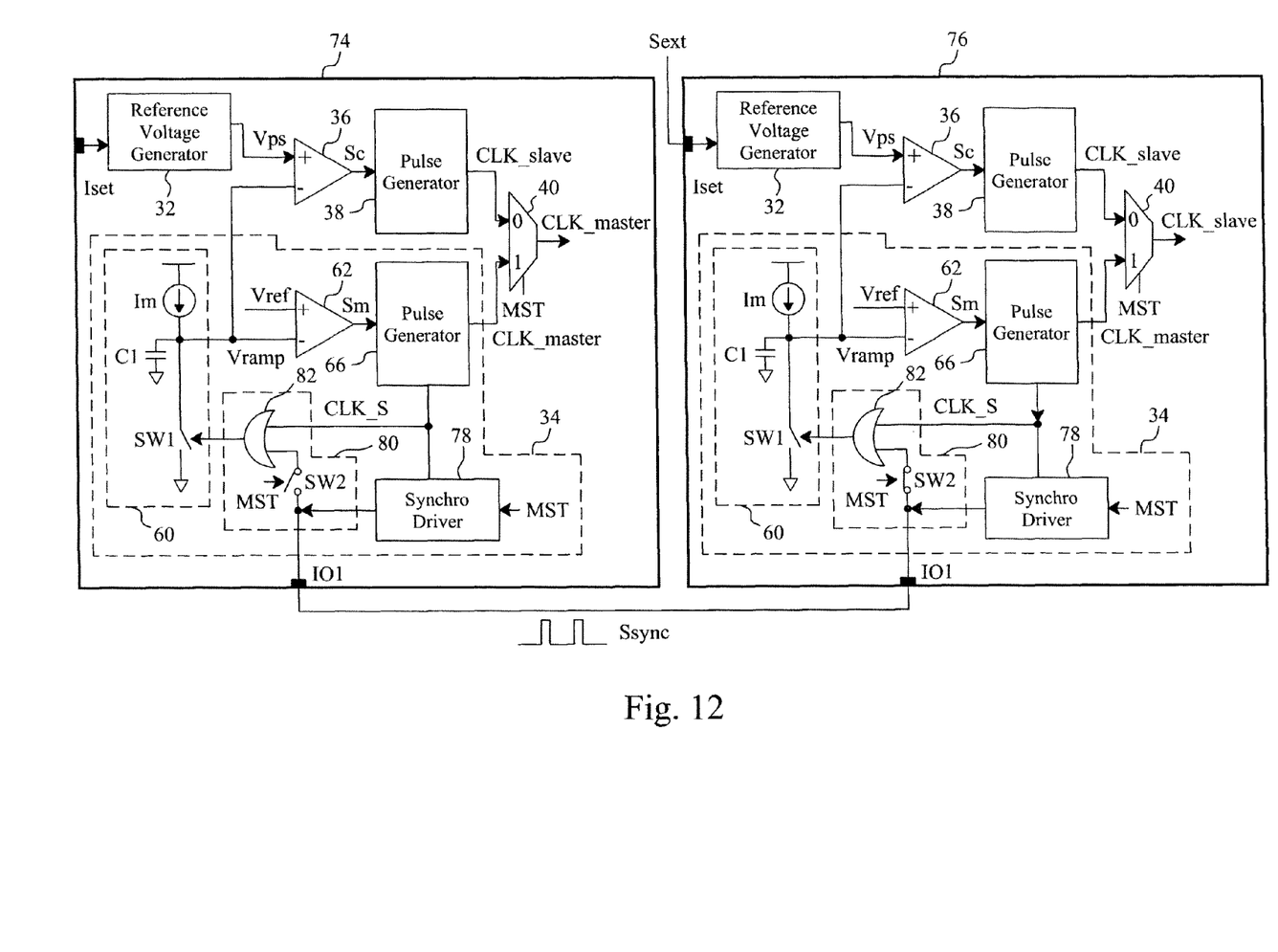
FIG. 12 is an embodiment of an apparatus using the clock generator of FIG. 11 to establish a master/slave scheme for implementing interleaved phase shift clock synchronization.

FIG. 12 is an embodiment of an apparatus using the clock generator of FIG. 11 to establish a master/slave scheme for implementing interleaved phase shift clock synchronization, which includes a master clock generator 74 and a slave clock generator 76. In this embodiment, the ramp generator 34 includes a charge/discharge circuit 60 to generate a ramp signal Vramp, a comparator 62 to compare the ramp signal Vramp with a reference voltage Vref to generate a comparison signal Sm, a pulse generator 66 to generate a clock CLK_master and a clock CLK_S responsive to the comparison signal Sm, a synchronization driver 78 to provide a reset signal Ssync applied to an input/output terminal IO1 responsive to the clock CLK_S when enabled by the master signal MST, and a logic circuit 80 to control the charge/discharge circuit 60 responsive to the clock CLK_S or a reset signal Ssync received from the input/output terminal IO1. The charge/discharge circuit 60 has a capacitor C1, a current source Im serially coupled to the capacitor C1, and a switch SW1 shunt to the capacitor C1 and switched by the logic circuit 80. The logic circuit 80 has a switch SW2 and an OR gate 82. The OR gate 82 has an output terminal coupled to the switch SW1, a first input terminal to receive the clock CLK_S, and a second input terminal coupled to the input/output terminal IO1 via the switch SW2. In the master clock generator 74, the master signal MST is logic "1" and thus turns off the switch SW2, the logic circuit 80 controls the charge/discharge circuit 60 to generate the ramp signal Vramp responsive to the clock CLK_S, the multiplexer 40 selects the clock CLK_master to output, and the synchronization driver 78 provides a reset signal Ssync applied to the input/output terminal IO1 for the slave clock generator 76. In the slave clock generator 76, the master signal MST is logic "0" and thus turns on the switch SW2, the reference voltage generator 32 is enabled to generate a reference voltage Vps responsive to an input signal Sext received from the input terminal Iset, the logic circuit 80 controls the charge/discharge circuit 60 to generate a ramp signal Vramp responsive to the reset signal Ssync from the input/output terminal IO1, and the multiplexer 40 selects the clock CLK_slave to output.

Figure 13:
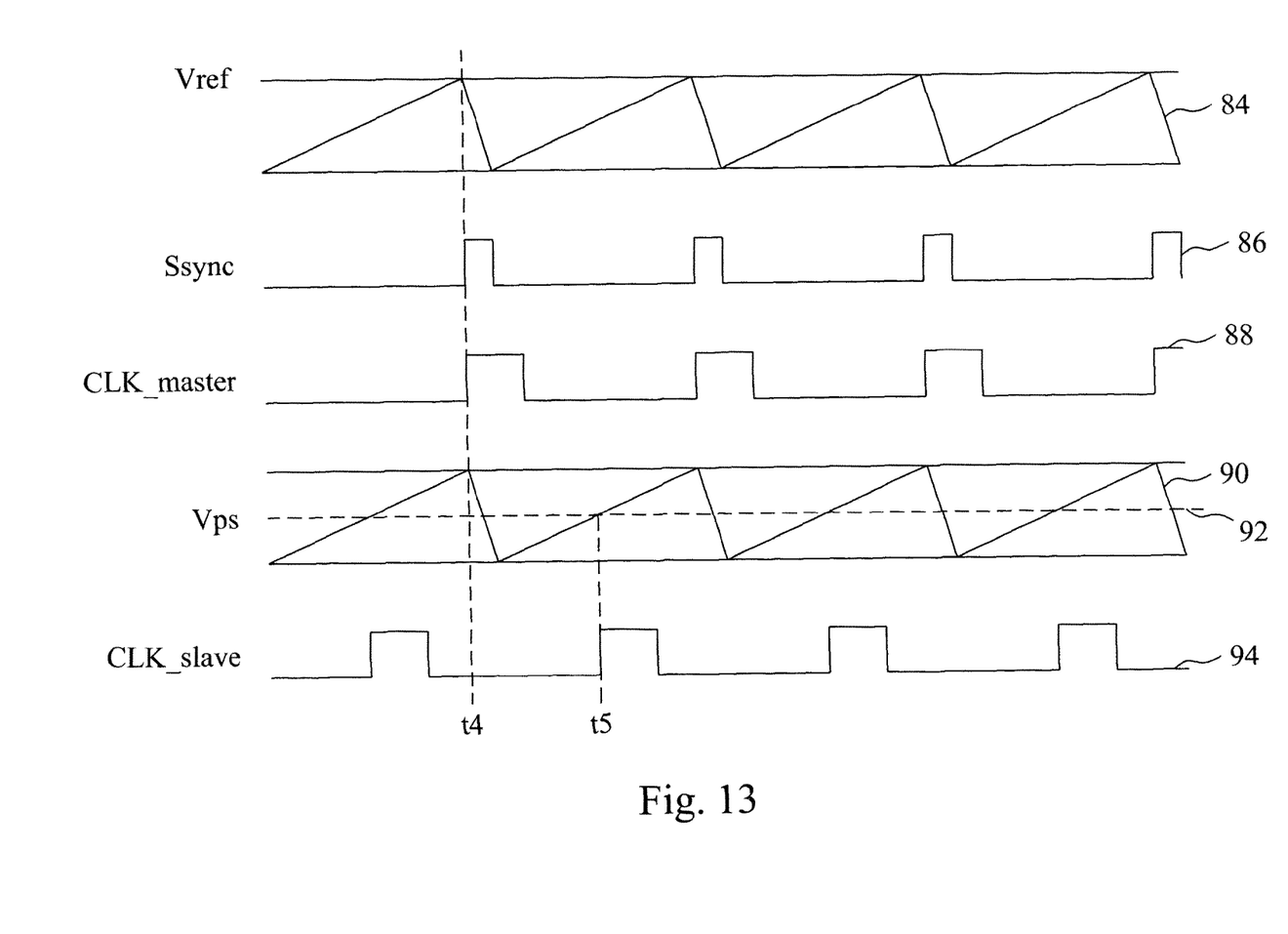
FIG. 13 is a waveform diagram of the circuit shown in FIG. 12.

FIG. 13 is a waveform diagram of the circuit shown in FIG. 12, in which waveform 84 represents the ramp signal Vramp of the master clock generator 74, waveform 86 represents the reset signal Ssync generated by the master clock generator 74 and received by the slave clock generator 76, waveform 88 represents the clock CLK_master, waveform 90 represent the ramp signal Vramp of the slave clock generator 76, waveform 92 represents the reference voltage Vps, and waveform 94 represent the clock CLK_slave. Referring to FIGS. 12 and 13, when the ramp signal Vramp of the master clock generator 74 increases to the reference voltage Vref, as shown by the waveform 84 at time t4, both the reset signal Ssync and the clock CLK_master are triggered, as shown by the waveforms 86 and 88, the slave clock generator 76 resets the ramp signal Vramp responsive to the reset signal Ssync, as shown by the waveform 90. When the ramp signal Vramp of the master clock generator 74 is reset, the reset signal Ssync will reset the ramp signal Vramp of the slave clock generator 76 simultaneously, and thus the ramp signal Vramp of the slave clock generator 76 and the master clock generator 74 is synchronized with each other. Moreover, the master clock generator 74 and the slave clock generator 76 have the substantially same current sources Im, and thus generate the substantially same ramp signals Vramp. When the ramp signal Vramp of the slave clock generator 76 increases to the reference voltage Vps, the clock CLK_slave will be triggered, as shown by the waveform 94 at time t5; however, due to the reference voltages Vref and Vps having different levels, the clock CLK_master of the master clock generator 74 and the clock CLK_slave of the slave clock generator 76 are synchronized to each other with a phase difference. In this embodiment, it is feasible to increase the number of the slave clock generator 76 as needed, and by setting the reference voltages Vps of the slave clock generators 76 to different levels, clocks CLK_slave synchronized and phase interleaved with each other will be generated.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A clock generator, comprising:
   a first input/output terminal;
   a second input/output terminal;
   a reference voltage generator coupled to the first input/output terminal, and after being enabled by a master signal, operative to generate a reference voltage;
   a ramp generator coupled to the second input/output terminal and the reference voltage generator, and after being enabled by the master signal, operative to provide a ramp signal applied to the second input/output terminal and to generate a first clock depending on the ramp signal and the reference voltage;
   a comparator coupled to the first and second input/output terminals, comparing signals at the first and second input/output terminals to generate a comparison signal;
   a pulse generator coupled to the comparator, responsive to the comparison signal to generate a second clock; and
   a multiplexer coupled to the ramp generator and the pulse generator, responsive to the master signal to select one of the first and second clocks as an output signal.

2. The clock generator of claim 1, wherein the reference voltage is applied to the first input/output terminal.

3. The clock generator of claim 1, wherein the ramp generator comprises:
   a charge/discharge circuit coupled to the second input/output terminal, operative to generate the ramp signal;
   a second comparator coupled to the charge/discharge circuit and the reference voltage generator, comparing the ramp signal with the reference voltage to generate a second comparison signal;
   a second pulse generator coupled to the second comparator, responsive to the second comparison signal to generate the first clock; and
   a third pulse generator coupled to the second comparator and the charge/discharge circuit, responsive to the second comparison signal to generate a control signal for controlling the charge/discharge circuit.

4. An apparatus for interleaved phase shift clock synchronization, comprising:
   a master clock generator having a ramp generator to provide a ramp signal and to generate a first clock depending on the ramp signal and a first reference voltage; and
   at least one slave clock generator, each slave clock generator including:
     a comparator coupled to the ramp generator, comparing the ramp signal with a second reference voltage to generate a comparison signal; and
     a pulse generator coupled to the comparator, responsive to the comparison signal to generate a second clock synchronized and phase interleaved with the first clock.

5. The apparatus of claim 4, further comprising a voltage divider coupled to the comparator, dividing the first reference voltage to generate the second reference voltage.

6. The apparatus of claim 4, further comprising a voltage divider coupled to the comparator, dividing a third reference voltage to generate the second reference voltage.

7. The apparatus of claim 4, further comprising:
   a resistor coupled to the comparator; and
   a current source coupled to the resistor, providing a current to the resistor to generate the second reference voltage.

8. The apparatus of claim 4, wherein the ramp generator comprises:
   a charge/discharge circuit operative to generate the ramp signal;
   a second comparator coupled to the charge/discharge circuit, comparing the ramp signal with the first reference voltage to generate a second comparison signal;
   a second pulse generator coupled to the second comparator, responsive to the second comparison signal to generate the first clock; and
   a third pulse generator coupled to the second comparator and the charge/discharge circuit, responsive to the second comparison signal to generate a control signal for controlling the charge/discharge circuit.

9. A method for interleaved phase shift clock synchronization, comprising the steps of:
   providing a ramp signal;
   comparing the ramp signal with a first reference voltage to generate a first comparison signal;
   generating a first clock responsive to the first comparison signal;

comparing the ramp signal with a second reference voltage to generate a second comparison signal; and responsive to the second comparison signal, generating a second clock synchronized and phase interleaved with the first clock.

10. The method of claim 9, further comprising the step of dividing the first reference voltage to generate the second reference voltage.

11. The method of claim 9, further comprising the step of dividing a third reference voltage to generate the second reference voltage.

12. The method of claim 9, further comprising the step of providing a current to a resistor to generate the second reference voltage.

13. The method of claim 9, further comprising the step of controlling charging and discharging a capacitor responsive to the first comparison signal to generate the ramp signal.

14. A clock generator, comprising:
an input terminal;
an input/output terminal;
a ramp generator coupled to the input/output terminal, providing a ramp signal, generating a first clock depending on the ramp signal and a first reference voltage, and triggering a first reset signal applied to the input/output terminal responsive to a master signal or resetting the ramp signal responsive to a second reset signal received from the input/output terminal;
a reference voltage generator coupled to the input terminal, generating a second reference voltage responsive to an input signal received from the input terminal;
a comparator coupled to the ramp generator and the reference voltage generator, comparing the ramp signal with the second reference voltage to generate a comparison signal;
a pulse generator coupled to the comparator, responsive to the comparison signal to generate a second clock; and
a multiplexer coupled to the ramp generator and the pulse generator, responsive to the master signal to select one of the first and second clocks as an output signal.

15. The clock generator of claim 14, wherein the ramp generator comprises:
a charge/discharge circuit operative to generate the ramp signal;
a second comparator coupled to the charge/discharge circuit, comparing the ramp signal with the first reference voltage to generate a second comparison signal;
a second pulse generator coupled to the second comparator, responsive to the second comparison signal to generate the first clock and a third clock;
a synchronization driver coupled to the second pulse generator and the input/output terminal, and after being enabled by the master signal, operative to generate the first reset signal responsive to the third clock; and
a logic circuit coupled to the charge/discharge circuit, the second pulse generator, and the input/output terminal, responsive to the third clock or the second reset signal to control the charge/discharge circuit.

16. An apparatus for interleaved phase shift clock synchronization, comprising:
a master clock generator having a first ramp generator to provide a first ramp signal and a reset signal synchronized with the first ramp signal, and to generate a first clock depending on the first ramp signal and a first reference voltage; and
at least one slave clock generator, each slave clock generator including:
a second ramp generator coupled to the first ramp generator, operative to provide a second ramp signal and to reset the second ramp signal responsive to the reset signal;
a comparator coupled to the second ramp generator, comparing the second ramp signal with a second reference voltage to generate a comparison signal; and
a pulse generator coupled to the comparator, responsive to the comparison signal to generate a second clock synchronized and phase interleaved with the first clock.

17. The apparatus of claim 16, wherein the first ramp generator comprises:
a charge/discharge circuit operative to generate the first ramp signal;
a second comparator coupled to the charge/discharge circuit, comparing the first ramp signal with the first reference voltage to generate a second comparison signal;
a second pulse generator coupled to the second comparator, responsive to the second comparison signal to generate the first clock and a third clock;
a synchronization driver coupled to the second pulse generator, responsive to the third clock to generate the reset signal; and
a logic circuit coupled to the charge/discharge circuit and the second pulse generator, responsive to the third clock to control the charge/discharge circuit.

18. The apparatus of claim 16, wherein the second ramp generator comprises:
a charge/discharge circuit operative to generate the second ramp signal; and
a logic circuit coupled to the charge/discharge circuit and the first ramp generator, responsive to the reset signal to control the charge/discharge circuit.

19. A method for interleaved phase shift clock synchronization, comprising the steps of:
A.) providing a first ramp signal, a second ramp signal, and a reset signal for resetting the second ramp signal, wherein the reset signal is synchronized with the first ramp signal such that the second ramp signal will be synchronized with the first ramp signal;
B.) generating a first clock depending on the first ramp signal and a first reference voltage; and
C.) generating a second clock synchronized and phase interleaved with the first clock depending on the second ramp signal and a second reference voltage.

20. The method of claim 19, wherein the step A comprises the steps of:
comparing the first ramp signal with the first reference voltage to generate a comparison signal;
generating a third clock responsive to the comparison signal;
responsive to the third clock, generating the reset signal and the first ramp signal; and
resetting the second ramp signal responsive to the reset signal.

* * * * *